United States Patent
Bodell et al.

(10) Patent No.: US 7,921,415 B1
(45) Date of Patent: Apr. 5, 2011

(54) EXTERNALLY LOADED BROWSER INTERPRETER FOR NON-NATIVE LANGUAGE SUPPORT

(75) Inventors: Michael William Bodell, Santa Clara, CA (US); Matthew D. Oshry, Albany, CA (US); Brandon William Porter, Foster City, CA (US)

(73) Assignee: TellMe Networks, Inc., Mountain View, CA (US)

( * ) Notice: Subject to any disclaimer, the term of this patent is extended or adjusted under 35 U.S.C. 154(b) by 1273 days.

(21) Appl. No.: 11/419,473

(22) Filed: May 19, 2006

(51) Int. Cl.
*G06F 9/45* (2006.01)
(52) U.S. Cl. ......................................................... 717/139
(58) Field of Classification Search .................... 717/139
See application file for complete search history.

(56) References Cited

U.S. PATENT DOCUMENTS

| | | | |
|---|---|---|---|
| 6,978,447 B1 * | 12/2005 | Okmianski | 717/139 |
| 7,058,164 B1 * | 6/2006 | Chan et al. | 379/88.17 |
| 7,068,266 B1 * | 6/2006 | Ruelle | 345/418 |
| 7,068,643 B1 * | 6/2006 | Hammond | 370/352 |
| 2007/0169110 A1 * | 7/2007 | Gupta et al. | 717/174 |

* cited by examiner

*Primary Examiner* — John Chavis
(74) *Attorney, Agent, or Firm* — Perkins Coie LLP

(57) ABSTRACT

An interpreter program is described that may be loaded from an external resource when needed by a host. In one implementation, the interpreter program is written in a first language and is capable of interpreting a second language. A program, written in the second language, is provided as data to the interpreter program. The interpreter program may then execute the program.

30 Claims, 5 Drawing Sheets

EXTERNALLY LOADED BROWSER INTERPRETER FOR NON-NATIVE LANGUAGE SUPPORT

BACKGROUND

A. Field of the Invention

Implementations described herein relate generally to computer program interoperability, and more specifically, to program language interpreters.

B. Description of the Related Art

Web browsers frequently support native execution of programs written in certain languages, such as JavaScript, JScript, or VBScript. For example, when browsing a hypertext markup language (HTML) web site, a user's browser may download a JavaScript, JScript, or VBScript program from the web site. The browser natively executes the downloaded script to, for example, perform tasks that would typically not be possible in HTML alone (e.g., validating a web form, opening a pop-up window, etc.).

In conventional systems, a browser does not support native execution of all languages. Providing native support for a language is burdensome on a developer, as it requires the developer to have access to the browser code base and may require the developer to write large quantities of browser code for each browser to which the developer would like to introduce native support.

SUMMARY

One aspect is directed to a method performed at a host computing device. The method includes loading, in response to a statement in a document being parsed, an interpreter program written in a language natively supported by the host computing device, the interpreter program being designed to interpret a second program language that is not natively supported by the host computing device. The method further includes loading a second program written in the second program language and executing the second program using the interpreter program.

Another aspect is directed to a browser. The browser includes logic to load an interpreter program written in a language natively supported by the browser, the interpreter program being designed to interpret a second program language that is not natively supported by the browser. The browser further includes logic to load a second program written in the second program language; and logic to execute the interpreter program, whereby the interpreter program executes the second program.

Another aspect is directed to a method that includes transmitting an interpreter program to a browser, the interpreter program being written in a programming language natively supported by the browser and designed to interpret a programming language that is not natively supported by the browser.

Yet another aspect is directed to a computer-readable medium containing programming instructions for execution at a processor. The programming instructions include instructions written in a first language to interpret XML data as a program written in a second language and to execute the program written in the second language. The instructions further include instructions, written in the second language and packaged as the XML data.

Yet another aspect is directed to a method including providing an interpreter program written in a first language and capable of interpreting a second language; providing a program written in the second language, the program being provided as data for the interpreter program; and executing the program with the interpreter program.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The same reference numbers in different drawings may identify the same or similar elements. The detailed description does not limit the invention.

Overview

A system is described herein in which an interpreter program is loaded into a browser and executes a program written in a language that is not natively supported by the browser.

System Description

Figure 1:
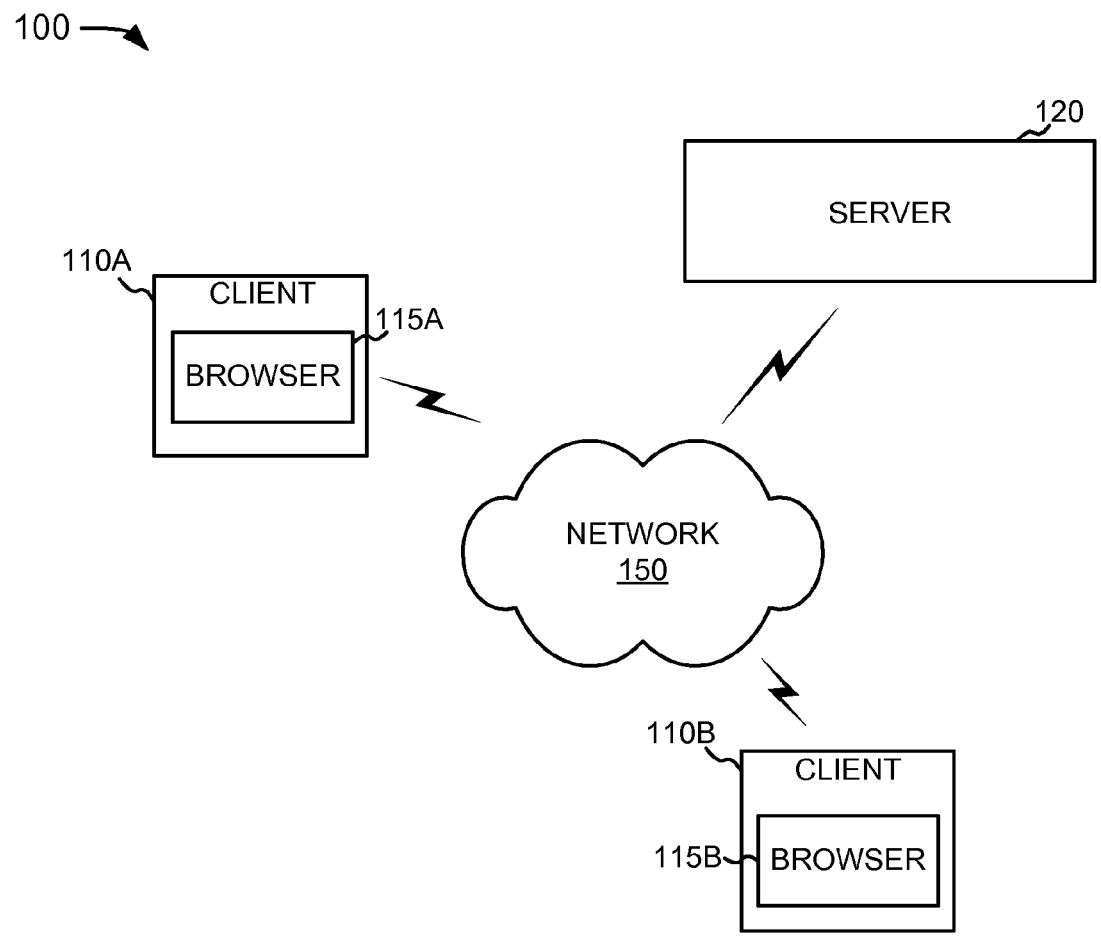
FIG. 1 is a diagram of an exemplary system in which concepts consistent with principles of the invention may be implemented.

FIG. 1 is a diagram of an exemplary system 100 in which concepts consistent with the principles of the invention may be implemented. System 100 may include multiple clients 110A and 110B (collectively, clients 110) that can connect to a server 120, via a network 150. Network 150 may include a local area network (LAN), a wide area network (WAN), a telephone network, such as the Public Switched Telephone Network (PSTN), an intranet, the Internet, or a combination of networks. Clients 110 and server 120 are illustrated as connected to network 150 for simplicity. In practice, there may be more clients and/or servers. Also, in some instances, a client may perform one or more functions of a server and a server may perform one or more functions of a client.

Each of clients 110 may include a device, such as a personal computer, a lap top computer, a wireless telephone, a personal digital assistant (PDA), or another type of computation or communication device. Users of clients 110 may access or receive information from server 120. For example, server 120 may act as a web server that delivers information to hypertext markup language (HTML) browser programs 115A and 115B (collectively, browser programs 115) at clients 110. As another example, server 120 may act as a voice server that delivers voice information to voice browser programs 115 at clients 110 via the VoiceXML (VXML) standard. Both HTML browsers and voice browsers are known in the art. A voice browser, in particular, may present an interactive voice interface to the user. Similar to the manner in which a visual web browser works with HTML pages, a voice browser may operate on pages that specify voice dialogues and may present information aurally, using pre-recorded audio file playback or using text-to-speech software to render textual information as audio, to the user.

Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context of the role of the computing device within the application.

Exemplary Computing Device Architecture

Figure 2:
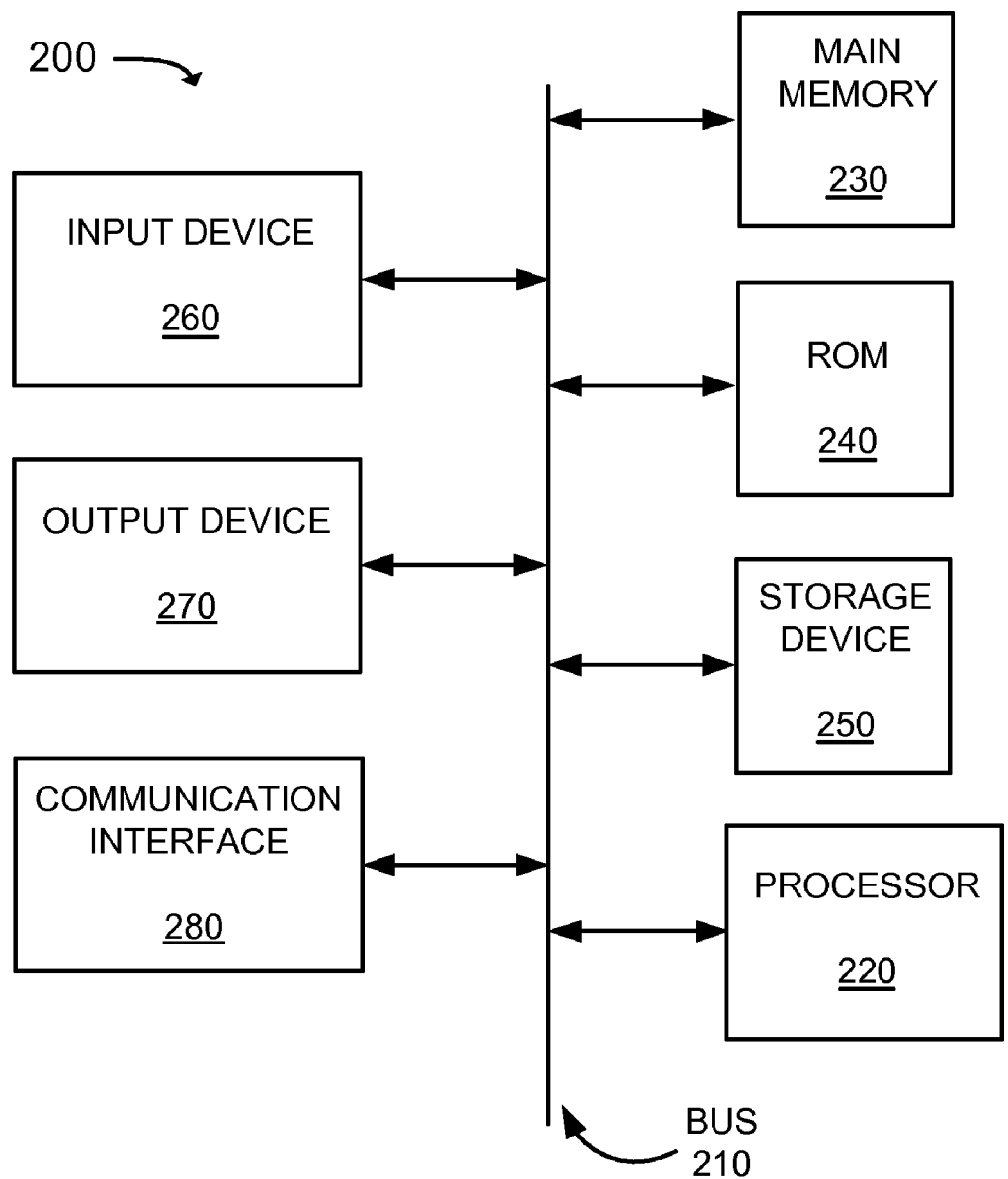
FIG. 2 is a diagram of an exemplary computing device, such as one of the computing devices shown in FIG. 1.

FIG. 2 is an exemplary diagram of a computing device 200, such as one of clients 110 or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, voice recognition and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 250.

Applications executed by computer device 200, such as browsers 115, may be implemented in software and stored in a computer-readable medium, such as memory 230. A computer-readable medium may be defined as one or more physical or logical memory devices.

The software instructions defining applications executed by computer device 200 may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Externally Loaded Interpreter

Figure 3:
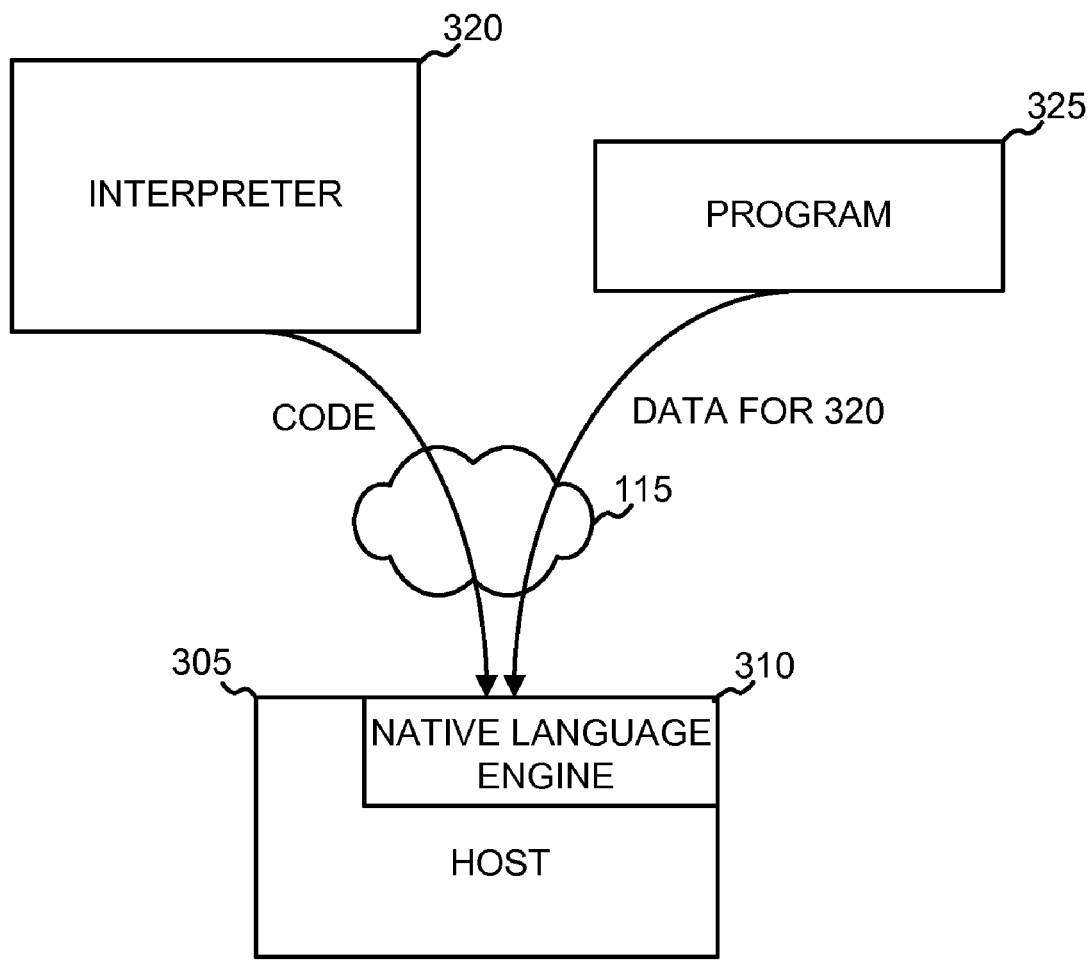
FIG. 3 is a diagram conceptually illustrating exemplary components associated with an externally loaded interpreter.

FIG. 3 is a block diagram conceptually illustrating exemplary components associated with an externally loaded interpreter described herein. As shown, a host 305 may include a native language engine 310. Native language engine 310 may receive programming code and data via a network 115. In particular, native language engine 310 may receive an interpreter program 320 written in a language natively supported by native language engine 310. Additionally, native language engine 310 may receive a program 325, which is written in a non-native language.

Host 305 may be, for example, a browser application, such as a HTML browser or a voice browser. In other implementations, host 305 may be another application or process, such as a process resident at server 120 and providing services to clients 110.

Native language engine 310 may include logic that supports interpretation of a "native" language by host 305. Native language engine 310 may execute natively with respect to host 305. Executing natively with respect to host 305, as used herein, means that native language engine 310 operates as a part of host 305. In other words, native language engine 310 may be available for use by host 305 whenever host 305 is running. Native language engine 310 may, for example, be implemented as an embedded module that is compiled with host 305 or be implemented as a downloadable "plugin" that, once installed within host 305, is available when host 305 is initiated.

Examples of the "native" language supported by native language engine 310 may include ECMAScript languages such as JavaScript or JScript, or other languages such as VBScript. JavaScript, JScript, and VBScript are widely supported on many conventional browsers. One of ordinary skill in the art will recognize that the particular native language(s) supported by native language engine 310 is not critical.

Program 325 may be any program written in a language that is not natively supported by host 305. Accordingly, applications written in this language cannot be natively executed by host 305. In one implementation, the language may be a XML-based language such as, for example, the known languages: SCXML (State Chart XML), MathML (Math Markup Language), SMIL (Synchronised Multimedia Integration Language), SVG (Scalable Vector Graphics), or WML (Wireless Markup Language). The language may also be non-XML languages, such as LISP or Python.

Interpreter program 320 may be a program written in a language that is natively supported by host 305. Interpreter program 320 is designed to interpret one or more languages that are not natively supported by host 305. As an example of an implementation of interpreter program 320, interpreter program 320 may be a JavaScript program.

Interpreter program 320 may be loaded by host 305 over, for example, network 115. Network 115 may be the Internet, a local area network, or any other type of network or connection capable of transferring data. Interpreter program 320 may also be loaded across a file system.

Interpreter program 320 may be loaded by host 305 in response to host 305 parsing a document that contains a reference to an external program. For example, an HTML or XML document being parsed by host 305 may include a "<script>" tag that specifies that a particular JavaScript program (i.e., interpreter program 320) is to be loaded. Program 325 may be loaded by host 305 in response to a reference in the document to external data. For example, program 325 may be an XML document fetched across a network. Interpreter program 320 may receive that XML document and execute program 325.

Figure 4:
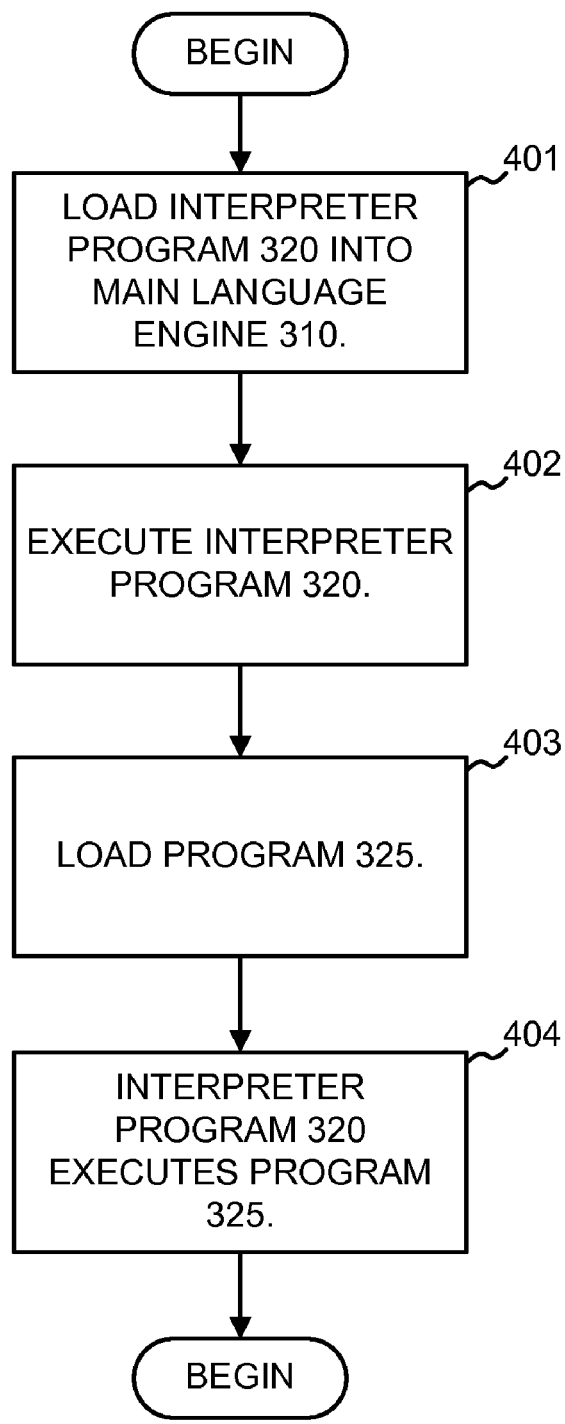
FIG. 4 is a flow chart illustrating an exemplary process relating to the externally loaded interpreter shown in FIG. 3.

FIG. 4 is a flow chart illustrating an exemplary process relating to the externally loaded interpreter program shown in FIG. 3.

The process of FIG. 4 may begin by loading interpreter program 320 into native language engine 310 of host 305 (act 401). As previously mentioned, interpreter program 320 may be an interpreter for a language that is not natively supported by host 305. Interpreter program 320 may be dynamically loaded by host 305 in response to an action by host 305. For example, as mentioned above, host 305 may include a browser that may browse a web page that includes a statement indicating that a particular script program (i.e., interpreter program 320) is to be loaded. In response, host 305 may download interpreter program 320 from an external computing resource that contains the script program.

Interpreter program 320 may be executed by native language engine 310 (act 402). In other words, native language engine 310 may execute the code embodied in interpreter program 320. Host 305 may additionally load program 325 (act 403). As mentioned, from the point of view host 305 and/or native language engine 310, program 325 may appear as data that is to be input to interpreter program 320. For example, program 325 may appear as XML data that is loaded using a "<data>" tag, over an HTTP XML request, or via an AJAX request.

Interpreter program 320 may receive the loaded data (e.g., program 325), recognize that the data is a program written in the non-native language, and execute program 325 (act 404).

Acts 401, 402, and 403 do not necessarily need to be implemented serially relative to one another. For example, interpreter program 320 and program 325 may be downloaded simultaneously with one another, or program 325 may be downloaded prior to loading or execution of interpreter program 320.

As described, an interpreter for a non-native language may be loaded, potentially on an as-needed basis, and may be used to interpret one or more programs written in non-native languages. Because the interpreter may be implemented in a language that is natively executed on browsers or other hosts (e.g., JavaScript or JScript), a large base of users can immediately begin executing programs in the non-native language, which may not be widely supported. This can be beneficial to users as they can execute programs in non-native languages without having to update software and in a manner that is potentially transparent to the user. It can also be advantageous to developers as it allows them to develop programs in the non-native language with knowledge that that their programs can be easily executed by the intended users. Moreover, externally loading the interpreter program can allow developers of the interpreter program to be more innovative by being able to more easily refine the interpreter program.

Exemplary Implementation

One particular embodiment illustrating an exemplary implementation of the externally loaded interpreter will next be described in connection with FIG. 5.

Figure 5:
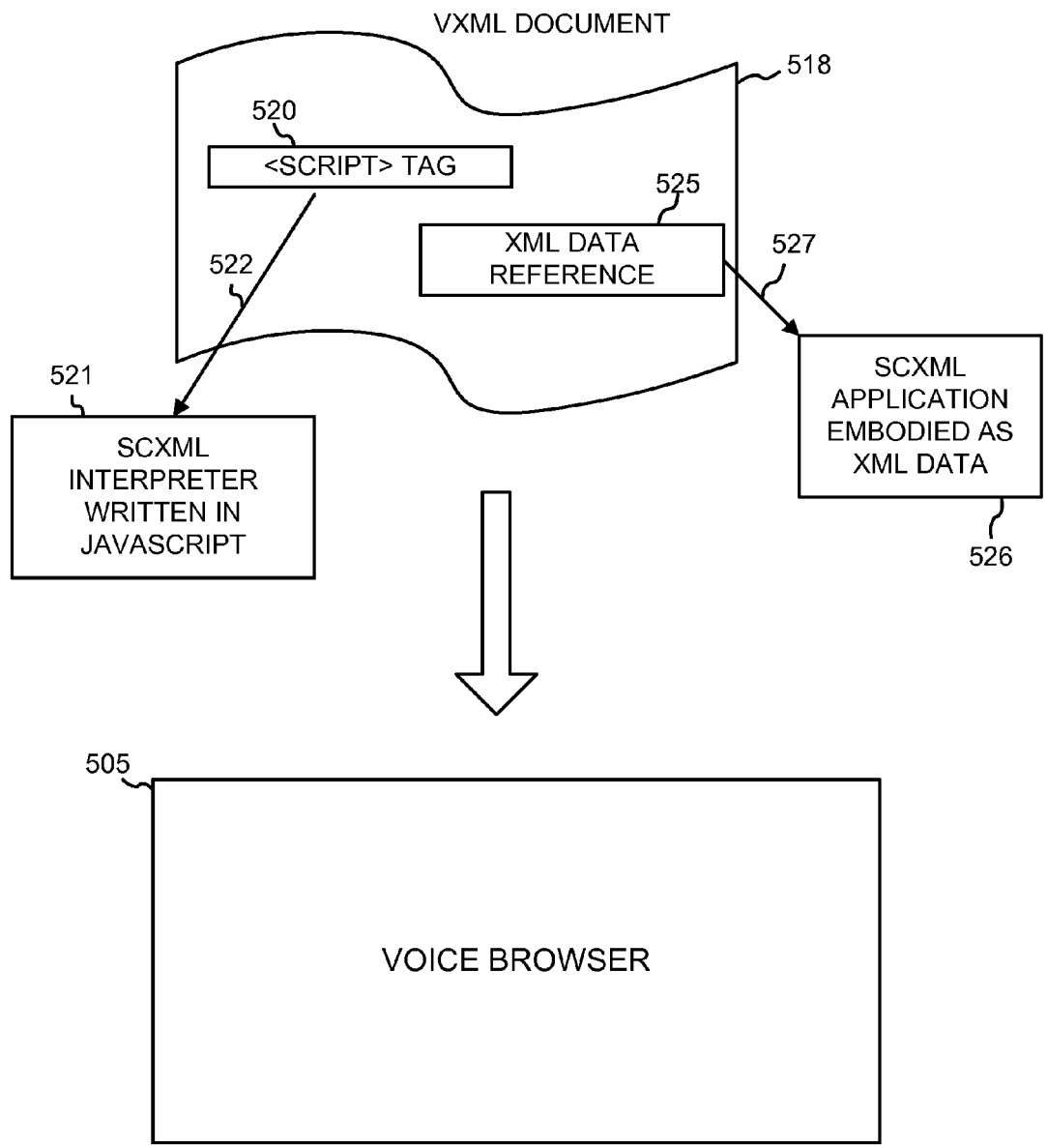
FIG. 5 is a diagram illustrating an exemplary implementation using the externally loaded interpreter.

FIG. 5 is a diagram illustrating an exemplary implementation of an externally loaded interpreter. A voice browser 505 is shown in FIG. 5. Voice browser 505 may include an embedded JavaScript engine. Assume that voice browser 505 is being used to navigate to a VXML (Voice XML) document 518. VXML is a standardized XML format for specifying interactive voice dialogues between a human and a computer. VXML document 518 may include a number of elements, and as shown, may include a script tag statement 520 and an XML data reference 525.

Script tag statement 520 may reference a script, such as SCXML interpreter 521, via a pointer 522. SCXML interpreter may be stored on the same computing resource as VXML document 518 or on another computing resource. SCXML interpreter 521 may be written in JavaScript and may be designed to interpret SCXML programs. SCXML is a known XML language designed to facilitate the manipulation of state machines.

XML data reference 525 may reference XML data 526 via a pointer 527. XML data 526 may define the particular SCXML application that is to be executed by voice browser 505. As with SCXML interpreter 521, XML data 526 may be stored on the same computing resource as VXML document 518 or on another computing resource.

Assume the user of voice browser 505 navigates to VXML document 518. In response, voice browser 505 may fetch and parse VXML document 518. When parsing script tag statement 520 in document 518, voice browser 505 may load SCXML interpreter 521. Voice browser 505 may also, in response to XML reference 525, load SCXML application 526 as XML data. SCXML interpreter 521 may receive the XML data as input, recognize the XML data as an SCXML application, and execute (i.e., interpret) the SCXML application. Accordingly, voice browser 505 is able to execute an SCXML application even though voice browser 505 does not have a native SCXML interpreter.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

Moreover, while series of acts have been described with regard to FIG. 4, the order of the acts may be varied in other implementations consistent with the invention. Moreover, non-dependent acts may be implemented in parallel or an order other than as described, as long as overall functionality consistent with the description is maintained.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed at a computing device, the method comprising:

loading from an external computing resource, an interpreter program written in a language natively supported by the computing device able to execute a voice browser, the interpreter program being designed to interpret a second program language that is not natively supported by the voice browser on the computing device;

loading a second program written in the second program language; and executing the second program, by the voice browser, using the interpreter program.

2. The method of claim 1, wherein the interpreter program is loaded in response to a statement in a document being parsed.

3. The method of claim 2 further comprising, loading the second program in response to a second statement in the document being processed.

4. The method of claim 1, wherein loading of the second program additionally includes loading the second program as XML data.

5. The method of claim 4, wherein the XML data is loaded based on a <data> tag or via an AJAX request.

6. The method of claim 1, wherein the second language is an XML-based language.

7. The method of claim 1, wherein the second language is SCXML (State Chart XML).

8. The method of claim 1, wherein the hest computing device includes an HTML browser or a voice browser.

9. The method of claim 1, wherein the interpreter program is written in one of JavaScript, JScript, or VBScript.

10. A method comprising:

transmitting an interpreter program to a voice browser executing on a host computing device, the interpreter program being written in a programming language natively supported by the voice browser and designed to interpret a programming language that is not natively supported by the browser;

wherein, the interpreter program is transmitted to the host computing device from another device external to the host computing device.

11. The method of claim 10, further comprising:

transmitting a second program to the browser as input data to the interpreter program.

12. The method of claim 11, wherein transmitting the second program is performed in response to a second request from the browser.

13. The method of claim 11, wherein the input data is XML data.

14. The method of claim 11, wherein the second program is written in an XML-based language.

15. The method of claim 14, wherein transmitting the interpreter program and the second program to the browser is performed over a wide area network.

16. The method of claim 10, wherein transmitting the interpreter program is performed in response to a request from the browser.

17. A method performed by a voice server, the method, comprising:

providing, by the voice server, to a computing device over a network, an interpreter program written in a first language and capable of interpreting a second language;

providing, by the voice server, to the computing device, a program written in the second language, the program being provided as data for the interpreter program; and executing the program, at the computing device, with the interpreter program.

18. The method of claim 17, wherein the program written in the second language is provided as XML data.

19. The method of claim 17, further comprising, providing the interpreter program to the computing device over the network from an external computing resource.

20. The method of claim 17, wherein the second language is SCXML (State Chart XML).

21. The method of claim 17, wherein the computing device includes a voice browser.

22. The method of claim 17, wherein the computing device includes an HTML browser.

23. A computer-readable medium having stored thereon instructions for execution by a computing device, the instructions, which when executed, cause a method to be performed at the computing device, the method comprising:

loading from a voice server, an interpreter program written in a language natively supported by a voice browser on the computing device, in response to a statement in a document being parsed;

the interpreter program being designed to interpret a second program language that is not natively supported by the voice browser on the computing device;

loading from the voice server, a second program written in the second program language at the voice browser;

executing, at the voice browser, the second program using the interpreter program;

wherein the second language is an XML-based language.

24. The method of claim 23, wherein the computing device includes a voice browser.

25. The method of claim 23, wherein the computing device includes an HTML browser.

26. A method performed at a computing device to execute an application written in a program language that is not natively supported by a voice browser, the method comprising:

parsing a VXML document by the voice browser;

detecting a statement in the VXML document referencing an interpreter program;

receiving, at the voice browser, an interpreter program which interprets the program language that is not natively supported by the voice browser;

loading a program written in the program language for execution at the voice browser.

27. The method of claim 26, wherein the interpreter program includes an SCXML interpreter and the program includes SCXML application, which is not natively supported by the voice browser.

28. The method of claim 27, further comprising, using the SCXML interpreter to natively execute the SXML application at the voice browser.

29. The method of claim 26, wherein the interpreter program is received over a network from an external source.

30. The method of claim 26, wherein the program language is an XML-based language.

* * * * *